US012362608B2

(12) United States Patent
Dang et al.

(10) Patent No.: US 12,362,608 B2
(45) Date of Patent: Jul. 15, 2025

(54) STATOR CORE AXIAL CHANNELS FOR TEMPERATURE REGULATION OF ELECTRIC MOTOR

(71) Applicant: Rivian IP Holdings, LLC, Irvine, CA (US)

(72) Inventors: Dang Dinh Dang, Garden Grove, CA (US); Logan Noel Balliett, Los Angeles, CA (US); Shreyas Kapatral, Fullerton, CA (US); Fan Wu, Rancho Palos Verdes, CA (US); Iftekhar Hasan, Lakewood, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/618,955

(22) Filed: Mar. 27, 2024

(65) Prior Publication Data
US 2025/0132617 A1  Apr. 24, 2025

Related U.S. Application Data

(60) Provisional application No. 63/592,134, filed on Oct. 20, 2023.

(51) Int. Cl.
*H02K 1/20* (2006.01)
*H02K 3/24* (2006.01)

(52) U.S. Cl.
CPC ................ *H02K 1/20* (2013.01); *H02K 3/24* (2013.01)

(58) Field of Classification Search
CPC ............. H02K 1/20; H02K 21/14; H02K 3/24
See application file for complete search history.

(56) References Cited

U.S. PATENT DOCUMENTS

2007/0176499 A1*  8/2007  Holmes ............... H02K 3/24
                                                     310/58
2010/0277016 A1   11/2010  Dang
(Continued)

FOREIGN PATENT DOCUMENTS

DE    102020107165 A1 *  7/2021
KR     20100070147 A  *  6/2010

OTHER PUBLICATIONS

Oh (KR 20100070147 A) English Translation (Year: 2010).*
Gotz (DE 102020107165 A1) English Translation (Year: 2021).*

*Primary Examiner* — Tulsidas C Patel
*Assistant Examiner* — Robert E Mates
(74) *Attorney, Agent, or Firm* — BAKERHOSTETLER

(57) ABSTRACT

Aspects of the subject disclosure relate to an electric motor that includes a stator and a rotor. The stator includes a stator body having a plurality of stator coil slots and a plurality of stator coils disposed respectively within the plurality of stator coil slots, each stator coil slot arranged a radially inner side of the stator body facing the rotor. The stator also includes a substrate mechanically coupled to the stator body and configured to receive a fluid via a manifold and distribute the fluid through a cavity formed between the substrate and the stator body. Each stator coil slot includes an opening forming a channel that extends longitudinally across the stator body for distributing the fluid through the channel and thermally interact with the plurality of stator coils and the stator body. Accordingly, the temperature of the electric motor can be regulated.

20 Claims, 12 Drawing Sheets

(56) References Cited

U.S. PATENT DOCUMENTS

| | | | |
|---|---|---|---|
| 2011/0133580 A1* | 6/2011 | Sugimoto | H02K 1/20 |
| | | | 310/54 |
| 2012/0107663 A1 | 5/2012 | Burgers | |
| 2014/0265662 A1 | 9/2014 | Shoykhet | |
| 2014/0265666 A1 | 9/2014 | Shoykhet | |
| 2016/0204486 A1 | 7/2016 | Kenney | |
| 2017/0244143 A1 | 8/2017 | Burgers | |
| 2018/0205125 A1 | 7/2018 | Bergers | |
| 2018/0252479 A1 | 9/2018 | Kenney | |
| 2018/0337434 A1 | 11/2018 | Burgers | |
| 2019/0109357 A1 | 4/2019 | Kenney | |
| 2019/0366876 A1 | 12/2019 | Cheadle | |
| 2020/0136205 A1 | 4/2020 | Graves | |
| 2020/0243934 A1 | 7/2020 | Galvis | |
| 2021/0226512 A1* | 7/2021 | Broomfield | H02K 9/06 |
| 2021/0242516 A1 | 8/2021 | Rahim | |
| 2021/0247145 A1 | 8/2021 | Vakilimoghaddam | |
| 2021/0254895 A1 | 8/2021 | Vakilimoghaddam | |
| 2022/0120518 A1 | 4/2022 | Vanderwees | |
| 2022/0336883 A1 | 10/2022 | Galvis | |
| 2022/0393526 A1* | 12/2022 | Jelinewski | H02K 9/193 |
| 2024/0022130 A1 | 1/2024 | Lettich | |

* cited by examiner

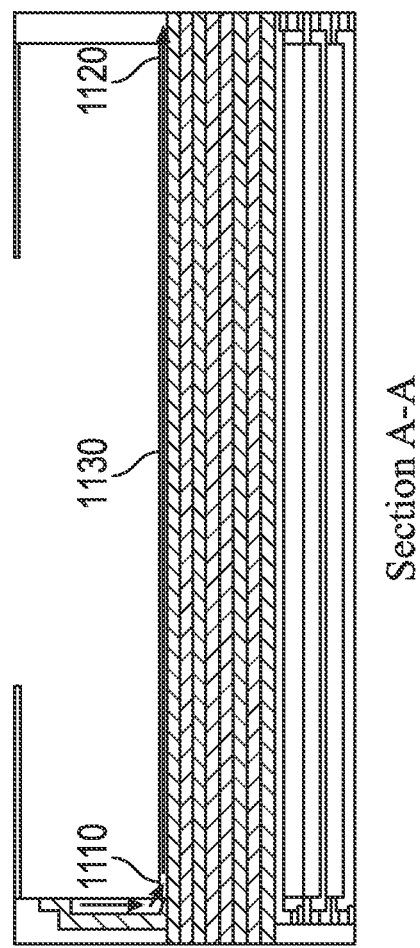
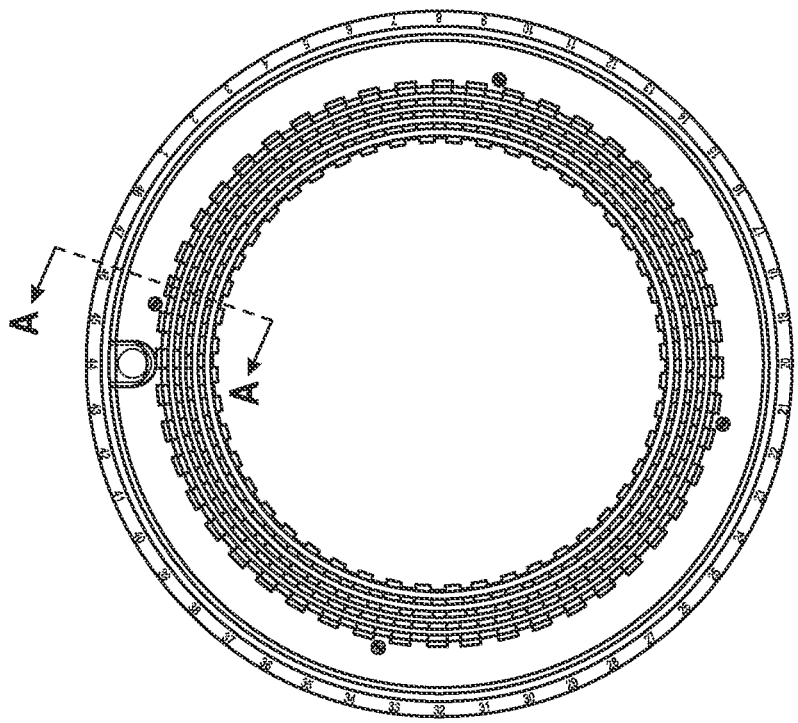
FIG. 11

STATOR CORE AXIAL CHANNELS FOR TEMPERATURE REGULATION OF ELECTRIC MOTOR

CROSS-REFERENCE TO RELATED APPLICATION(S)

This application claims the benefit of U.S. Provisional Application Ser. No. 63/592,134, entitled "STATOR CORE AXIAL CHANNELS FOR TEMPERATURE REGULATION OF ELECTRIC MOTOR," and filed on Oct. 20, 2023, the disclosure of which is expressly incorporated by reference herein in its entirety.

INTRODUCTION

The present disclosure relates generally to the automotive, manufacturing, and industrial equipment fields. More particularly, the present disclosure relates to stator core axial channels for temperature regulation of electric motor.

SUMMARY

The present description relates generally to an electric motor that includes a stator and a rotor. The stator includes a stator body comprising a plurality of stator coil slots and a plurality of stator coils disposed respectively within the plurality of stator coil slots, each of the plurality of stator coil slots arranged at a radially inner side of the stator body facing the rotor. The stator also includes a substrate mechanically coupled to the stator body and configured to receive a fluid via a manifold and distribute the fluid through a cavity formed between the substrate and the stator body. Each of the plurality of stator coil slots includes an opening forming a channel that extends longitudinally across the stator body for distributing the fluid through the channel and thermally interact with the plurality of stator coils and the stator body. Accordingly, the temperature of the electric motor can be regulated.

In accordance with one or more aspects of the disclosure, a stator body includes a plurality of stator coil slots and a plurality of stator coils disposed respectively within the plurality of stator coil slots, each of the plurality of stator coil slots arranged at a radially inner side of the stator body facing a rotor; and a substrate mechanically coupled to the stator body and configured to receive a fluid via a manifold and distribute the fluid through a cavity formed between the substrate and the stator body, wherein each of the plurality of stator coil slots includes an opening forming a channel that extends longitudinally across the stator body for distributing the fluid through the channel and thermally interact with the plurality of stator coils and the stator body.

In accordance with one or more aspects of the disclosure, a vehicle includes a drive unit comprising a stator and a rotor. The stator includes a stator body comprising a plurality of stator coil slots and a plurality of stator coils disposed respectively within the plurality of stator coil slots, each of the plurality of stator coil slots arranged a radially inner side of the stator body facing the rotor; and a substrate mechanically coupled to the stator body and configured to receive a fluid via a manifold and distribute the fluid through a cavity formed between the substrate and the stator body, wherein each of the plurality of stator coil slots includes an opening forming a channel that extends longitudinally across the stator body for distributing the fluid through the channel and thermally interact with the plurality of stator coils and the stator body.

BRIEF DESCRIPTION OF THE DRAWINGS

Certain features of the subject technology are set forth in the appended claims. However, for purpose of explanation, several embodiments of the subject technology are set forth in the following figures.

FIG. 11 illustrates a sectional view of a portion of a stator in accordance with one or more implementations of the subject technology.

DETAILED DESCRIPTION

Figure 1:
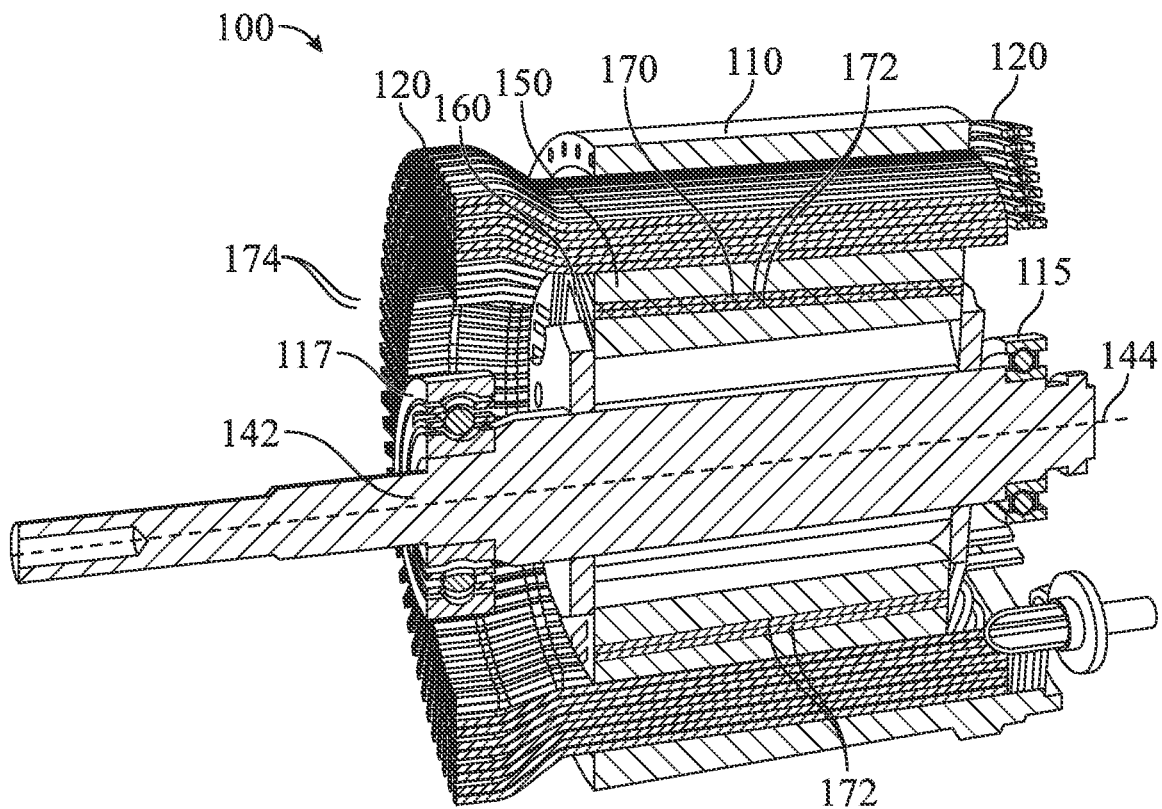
FIG. 1 illustrates a perspective sectional view of an example electric motor in accordance with one or more implementations of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electric machines, including motors and generators, play a role in various applications. Fundamental to their design and operation are numerous types of losses, each of which can significantly impact their performance. These losses encompass thermal losses, resistive losses occurring within the winding conductors, as well as hysteresis, eddy current, and excess losses within the motor core, among others.

The quantification of losses is central to the understanding and evaluation of electric machines. This quantification is commonly expressed through the efficiency rating, which measures the ability of an electric machine to convert electric power into mechanical power. Efficiency is typically calculated using the formula: efficiency=output power/input power, or equivalently, as 1 minus the ratio of losses to input power. These losses manifest in various forms, including the dissipation of energy in the form of heat, sound, vibration, and other undesirable effects.

Heat or thermal losses within an electric machine represent a particularly significant aspect of these losses. They have a compounding effect, contributing to increased resistances within the system and consequently escalating the rate of loss. Moreover, electric machines are constructed using materials that operate within specific temperature thresholds to prevent damage. Exceeding these thresholds can lead to adverse consequences, such as magnet derating or reductions in the electrical strength of stator winding enamel.

Various techniques have been developed to mitigate heat losses within electric machines. Examples include the implementation of water jackets that utilize conduction and convection to extract heat directly from the stator core. Additionally, direct cooling methods employ convection-based mechanisms, such as oil sprays, to dissipate heat from the stator core and windings.

The stator core, often referred to as the "stack," constitutes a substantial collection of laminated electrical steel and serves as a reservoir of thermal energy within the electric machine. Effective and direct cooling of the stator core offers the potential to significantly reduce the thermal energy retained within the electric machine, thus enhancing its overall performance and reliability.

The present description relates generally to a stator core in an electric motor is a component that consists of laminated iron cores and copper windings. The coils of the stator can be operated to generate a rotational magnetic field. When the electric motor operates, it generates heat due to the electrical resistance of the windings and the core losses associated with magnetic flux changes. If the temperature of the stator core rises too high and isn't regulated effectively, several issues can arise that adversely impact the lifespan and/or performance of the electric motor. Accordingly, the temperature of the electric motor can be regulated by distributing a fluid through channels formed through and around the stator core as needed.

The present disclosure provides for addressing efficient cooling within an electric machine's stator core. In one or more implementations, the stator core includes axial channels for directing cooling fluid through a manifold, enabling direct cooling of the stator core steel and copper windings. In one or more implementations, the axial channels include a channel geometry in the slots themselves to cool copper conductors and core material directly. The channel configuration of these axial channels facilitates effective cooling and balances magnetic flux paths. Adjustable channel geometry features offer flexibility for specific cooling needs. The stator core also includes a sealed manifold that introduces cooling fluid into these channels, and may also facilitate end turn cooling. The axial channel configuration and geometry facilitate even temperature distribution and efficient flow management for optimal thermal benefits without excessive power requirements.

In certain embodiments, the motor described herein can include features of a synchronous electric motor. However, it will be understood that one or more features of the present disclosure can apply to one of a variety of motor types, including induction motors (IMs), synchronous electric motors, externally excited synchronous motors (EESMs), permanent magnet synchronous electric motors (PMSMs), line start synchronous motors (LSSMs), line start permanent magnet motors (LSPMMs), and the like.

Referring to FIG. 1, a motor can include a stator and a rotor for providing rotational output at a shaft. FIG. 1 is a partial perspective view of a motor 100 having a stator 110 and a rotor 150.

In some embodiments, as shown in FIG. 1, a motor 100 can include a generally cylindrical rotor shaft 142 concentrically surrounded by a cylindrical rotor 150. As used herein, "cylindrical" and "annular" refer to structures having a generally circular internal cross-sectional shape, and likely a roughly circular external cross-sectional shape, although this external cross-sectional shape may vary to some degree, having flat or irregular regions. The rotor shaft 142 and rotor 150 are configured to rotate concentrically about a common central axis 144 in unison, potentially at high revolutions-per-minute (RPM). The rotor 150 can be manufactured from electric steel. The rotor shaft 142 can be manufactured from steel and/or other possible metal or metal alloy.

The motor 100 can include a stator 110 comprising stator coils 120 configured to generate a rotating magnetic field. The rotating magnetic field can be generated by running multiple-phase currents through the stator coils 120. The stator coils 120 can form segments of its windings distributed about the rotor 150. For example, as shown in FIG. 1, the stator coils 120 can form segments that each extend in a direction that is generally parallel to the central axis 144 of the rotor 150. The rotating magnetic field generated by the stator 110 can rotate about the central axis 144 of the rotor 150. Neither the stator 110 nor the stator coils 120 need to move to generate the rotating magnetic field. For example, the coils can be operated with an alternating current with different segments thereof having a different direction and/or magnitude of current at any given moment. As the current direction and/or magnitude changes for each segment of the stator coils 120 over time, the magnetic field generated in the vicinity thereof can correspondingly change. Accordingly, the resulting magnetic field can be characterized as a standing magnetic field (e.g., with alternating magnetic field directions extending circumferentially about the central axis 144) that rotates about the central axis 144. The rotating magnetic field can further extend through the rotor 150, which can include permanent magnets 160 and rotor coils 170. The rotating magnetic field generated by the stator 110 can magnetically interact with such components of the rotor 150 to cause the rotor 150 to rotate about the central axis 144.

End windings of the stator coils 120 (e.g., crown end windings and/or weld end windings) of the stator 110 can be of a conductive material such as copper or another suitable metal or material. The end windings of the stator coils 120 may protrude axially beyond the rotor 150 and/or concentrically surround the rotor 150. The end windings of the stator coils 120 are connected to each other in parallel and/or in series to form a set of winding with multiple-phase terminals, which are operably connected to a controller, such as a processing unit of an electronic system, described further herein.

The rotor shaft 142 and/or the rotor 150 can be rotated with a first bearing assembly 115 disposed at the first end of the rotor shaft 142 and a second bearing assembly 117 disposed at the second end of the rotor shaft 142. As such, the rotor 150 and/or the rotor shaft 142 can be rotated about the central axis 144 as it responds to the rotating magnetic field generated by the stator 110. The rotor shaft 142 can accordingly provide torque output. Such output can be detected, for example by a sensor of an electronic system, described further herein.

The rotor coils 170 can form winding segments 172 of its windings that extend within the rotor 150. For example, as shown in FIG. 1, the rotor coils 170 can form winding segments 172 that each extend in a direction that is generally parallel to the central axis 144 of the rotor 150. Additionally or alternatively, winding segments 172 can extend longitudinally in a direction that is generally parallel to the segments of the stator coils 120. Each winding segments 172 can extend to or toward one or both of longitudinally terminal ends of the rotor 150. For example, a given winding segment 172 can extend longitudinally within a body of the rotor 150 and connect to another winding segment 172 on a circumferentially adjacent pole of the rotor 150. As such, the winding segments 172 can form windings that extend both parallel to the central axis 144 and across the central axis 144 to form one or more loops. One or more end windings 174 can be provided at one or more ends of the rotor 150. Each of the end windings 174 of the of the rotor coils 170 can be operably connected to a controller, such as a processing unit of an electronic system, described further herein. In some embodiments, the end windings 174 can be connected to a power source through one or more brushes (not shown), such that the rotor 150 and the rotor coils 170 can rotate while the power source and/or control circuitry provides power (e.g., electric current) without rotating. Such brushes can further provide a generally consistent current to the rotor coils 170, such that the resulting temporary magnetic field can be maintained as needed during rotation of the rotor 150. Accordingly, the end windings 174 can be connected (e.g., with brushes) in a manner that facilitates rotation and an direct current (DC) through the rotor coils 170.

Figure 2:
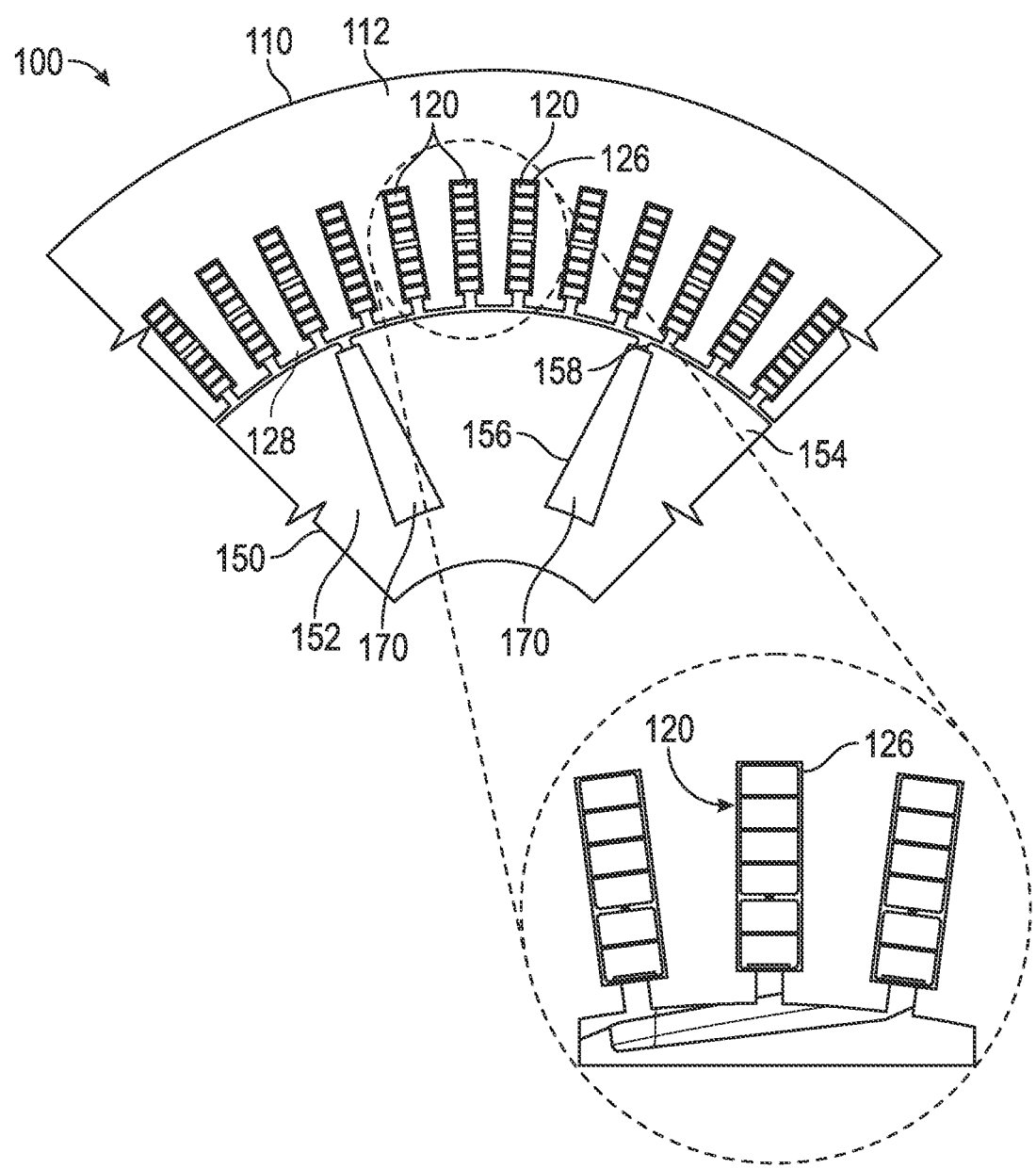
FIG. 2 illustrates a sectional view of a portion of the electric motor of FIG. 1 in accordance with one or more implementations of the subject technology.

Referring now to FIG. 2, a stator and a rotor can interact to provide rotational output. While FIG. 2 shows a portion of a motor 100, it will be understood that the portion shown can be a portion of a pattern that repeats circumferentially about a central axis to form continuous cylindrical structures. The pattern can repeat with any number of cycles, such that the illustrated example is not limited to the arrangement shown.

In some embodiments, as shown in FIG. 2, a stator 110 can include a stator body 112 and stator coils 120. The stator coils 120 and/or segments thereof can be positioned within stator coil slots 126 formed within the stator body 112. In one or more implementations, the stator coils 120 and/or segments thereof can be referred to as conductors. The stator coil slots 126 can be arranged at a radially inner side of the stator body 112 facing the rotor 150. The stator coil slots 126 can direct the magnetic fields generated by the stator coils 120 to be directed towards the rotor 150. The magnetic fields can be shaped, at least in part, by the geometry of the stator body 112. The portion of the stator body 112 at the radially inner side of the stator body 112 located between consecutive stator coil slots 126 can be referred to as a core tooth 128 of the stator body 112.

In some embodiments, as further shown in FIG. 2, a rotor 150 can include a rotor body 152. In some embodiments, the rotor coils 170 and/or segments thereof can be positioned within rotor coil slots 156 formed within the rotor body 152. The rotor coil slots 156 can form openings 158 at a radially outer side of the rotor body 152 facing the stator 110. For example, the rotor body 152 can define the openings 158 such that each opening 158 is disposed radially between a corresponding one of the multiple coil slots 156 and a radially outermost side of the rotor 150. The openings 158 can direct the magnetic fields generated by the rotor coils 170 to be directed towards the stator 110. The magnetic fields can be shaped, at least in part, by the geometry of the rotor body 152.

As described herein, the stator coils 120 can be operated to generate a rotating magnetic field. For example, the stator coils 120 can be operated with alternating current with different segments thereof having a different direction and/or magnitude of current at any given moment. As the current direction and/or magnitude changes for each segment of the stator coils 120 over time, the magnetic field generated in the vicinity thereof can correspondingly change. The rotating magnetic field generated by the stator 110 can magnetically interact with such components of the rotor 150 to cause the rotor 150 to rotate. The stator coils 120 of the stator 110 can be operated to generate a rotating magnetic field. For example, the stator coils 120 can be operated with variable current with different segments thereof having a different direction and/or magnitude of current at any given moment. As the current direction and/or magnitude changes for each segment of the stator coils 120 over time, the magnetic field generated in the vicinity thereof can correspondingly change.

In one or more implementations, the motor 100 may be characterized as a three-phase alternating current (AC) motor, resulting in an inherent emergence of eddy currents and stator core losses. These phenomena induce heat generation during motor operation under ordinary circumstances. Consequently, the stator 110 core and windings in the stator coils 120 can experience a temperature rise due to the current flow. Effective cooling of these windings and the stator 110 core assumes significance for reducing resistance and enhancing overall efficiency, as elevated resistance can lead to heightened losses and the risk of motor damage.

The central issue here revolves around the generation of heat within the motor 100, necessitating the adoption of suitable cooling measures. In one or more implementations, the motor 100 is bolted to a housing. In one or more other implementations, the motor 100 is shrink-fitted into a housing. The shrink-fitting configuration may involve heating the housing, placing the stack (e.g., the stator body 112) within, and allowing the housing to cool, thereby encapsulating the stator 110 core within the housing. This shrink-fitting configuration can rely on friction to secure the position of the stator 110 and prevent rotation. In one or more other implementations, this shrink-fitting configuration may include limited space for accommodating the installation of spray bars and other active cooling mechanisms employed in electric motor designs.

In one or more implementations, the stator 110 core can be cooled around its outer diameter. In other drive units, oil is caused to flow through a bar positioned above the stator 110. Subsequently, a spray is directed downward towards the end windings and, at times, the stator body 112. This enables the provision of an air cavity above, where items may be accommodated. In one or more implementations, through the application of heat shrinking, this cooling technique may be performed using cutouts in the outer diameter.

The subject technology provides for a method to eliminate spray bars and, instead, directly address the fundamental sources of heat generation in the stator 110 core, effectively regulating the temperature of the motor 100. As will be discussed with reference to FIG. 3, cooling of the motor 100 can be performed through the stator body 112 itself for sustaining an optimal temperature in the motor 100. For example, a manifold-like structure is introduced to the stator 110 core with the underlying objective to target the primary sources of heat within the stator 110. The bulk of the heat may emanate from the bottom portion of the conductors, which may be devoid of steel or convenient cooling pathways. To address this, the stator coil slot 126 is incorporated, enabling the directed flow of fluid to closely interact with the windings of the stator coils 120. This approach efficiently tackles the heat generated within the stator 110 core due to flux pathways created by the stator coil 120 windings and simultaneously cools the wires, which incur resistive losses because of the current passing through them.

Figure 3:
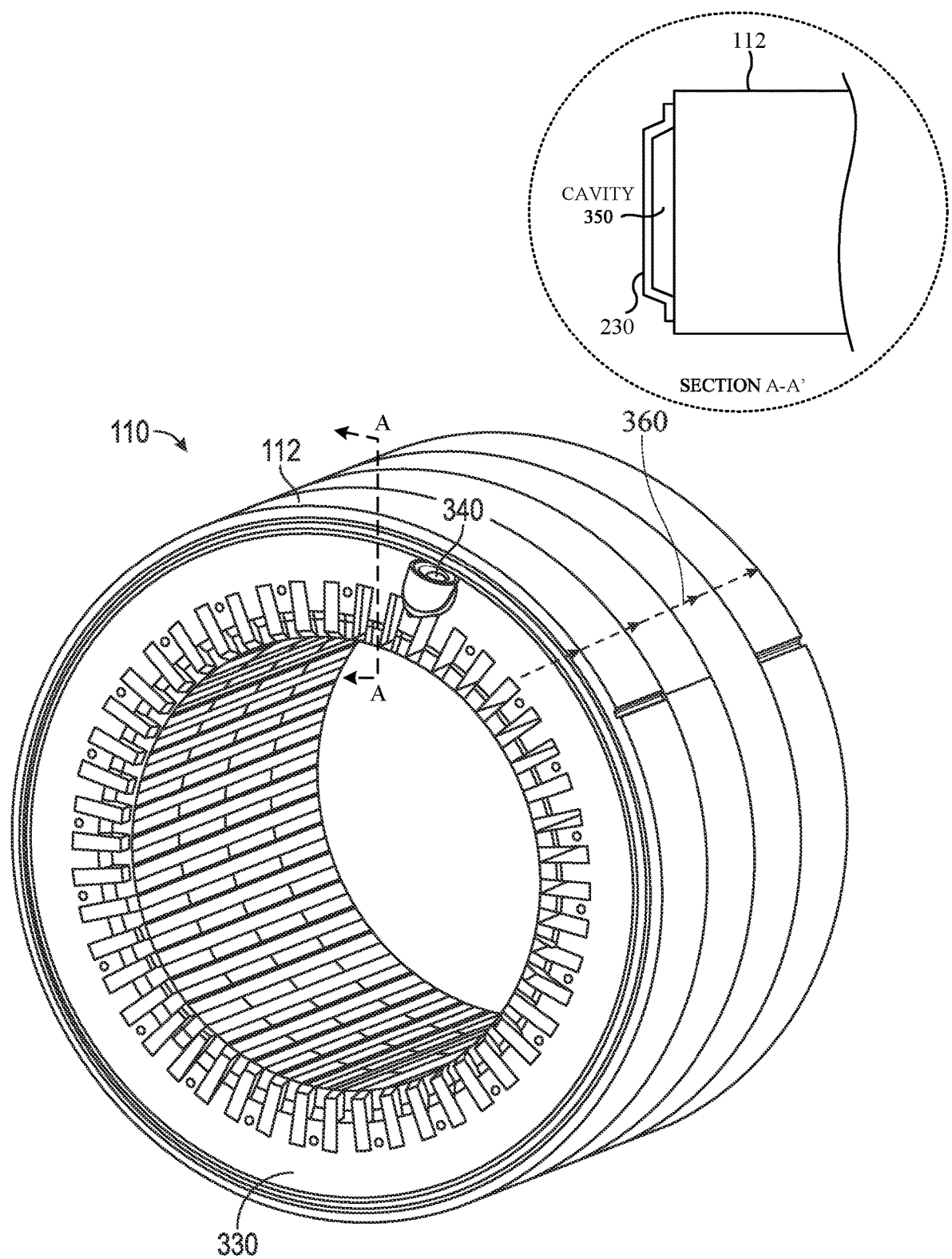
FIG. 3 illustrates a perspective view of an example stator in accordance with one or more implementations of the subject technology.

FIG. 3 illustrates a perspective view of an example stator in accordance with one or more implementations of the subject technology. In FIG. 3, the stator 110 includes the stator body 112 (also referred to herein as the "core"). The composition of the stator body 112 may consist of several thin steel layers, which are obtained from a coil and processed through a progressive die. This manufacturing process can involve stamping out various features, including slots, outer diameters (OD), inner diameters (ID), and similar characteristics. In one or more implementations, the innovation centers on the design of dies capable of incorporating an additional feature atop the slot, which can be stamped directly onto the steel sheets. In one or more implementations, various shapes and sizes of steel sheets are employed in this manufacturing process.

While the steel sheets are typically a quarter of a millimeter thick, the entire core measures around 125 millimeters. This core assembly includes approximately 500 sheets of steel. In one or more implementations, the core bonding methods encompass diverse techniques. For example, the bonding process may encompass gluing or welding, among other methods. In one or more implementations, the subject technology is not limited to a specific type of core bonding; it is adaptable to any existing core bonding technique.

In one or more implementations, the stator 110 includes a substrate 330 on one end of the stator body 112. The substrate 330 is a component that can be created through injection molding, utilizing materials such as nylon, PPS, or similar materials. Once molded, the substrate 330 may be subsequently coupled to specific surfaces within the stator body 112. For example, the substrate 330 may be epoxy bonded to the stator body 112. In other examples, the substrate 330 may be coupled in place to the stator body 112 by way of a clamping method (e.g., using a fastener, pinching the substrate 330 between wires and the stator body 112, pinching the substrate 330 between the stator body 112 and motor housing, etc.). In one or more other implementations, the substrate 330 can be formed of a metal or include a metallic material. In one or more other implementations, the substrate 330 can be formed as an integral part of the stator body 112. For example, a number of steel laminate sheets with particular cross sections can be stacked together to form the substrate 330. In one or more implementations, the substrate 330 may have a circular internal cross-sectional shape and a circular external cross-sectional shape that approximately aligns to the outer side surface of the stator body 112. In one or more other implementations, the stator 110 includes a substrate 330 on both opposite ends of the stator body 112.

In one or more implementations, axial channels (e.g., axial channel 360) are incorporated into the stator body 112, facilitating the routing of cooling fluid through the stator body 112 via a manifold 340. For example, the axial channel 360 (not visible) is represented with the dash line and is located where it is to allow cooling fluid to remove heat from both the conductors as well as the tooth/core/steel of the stator body 112 via direct contact with those components. In one or more implementations, the inlet of the manifold 340 may have a radial configuration. In one or more other implementations, the inlet of the manifold 340 may have an axial configuration. As illustrated in FIG. 3, the manifold 340 has a radially configured inlet. As illustrated in FIG. 3, the substrate 330 includes a deformed section on the back surface of the substrate 330 such that the substrate 330 can form an internal cavity (e.g., cavity 350) between the back surface of the substrate 330 and the outer side surface of the stator body 112 when the substrate 330 is coupled to the stator body 112. This configuration allows for the direct cooling of both the stator 110 core steel and the copper windings located within the stator coil slots 126.

In one or more implementations, the size of the stator body 112 can be minimized in order to optimize the electromagnetic design. This approach involves reducing steel content, thereby creating more space for flux pathways. Although this reduction in size of the stator body 112 can affect the overall system's torque output, efficient heat dissipation is increased. In this regard, the heat removal surpasses the heat generation, resulting in an overall enhancement of performance.

The distribution of thermal energy and the management of peak temperatures within the electric motor are governed by the distribution of oil flow through the axial channels of the stator 110 core. This configuration can promote substantially even temperature gradients within the motor 100 and assists in controlling the magnitude and locations of hot spots. Moreover, the cooling architecture of the motor 100 can accommodate requisite fluid flow without imposing penalties on the lubrication and cooling system restrictions.

Figure 4:
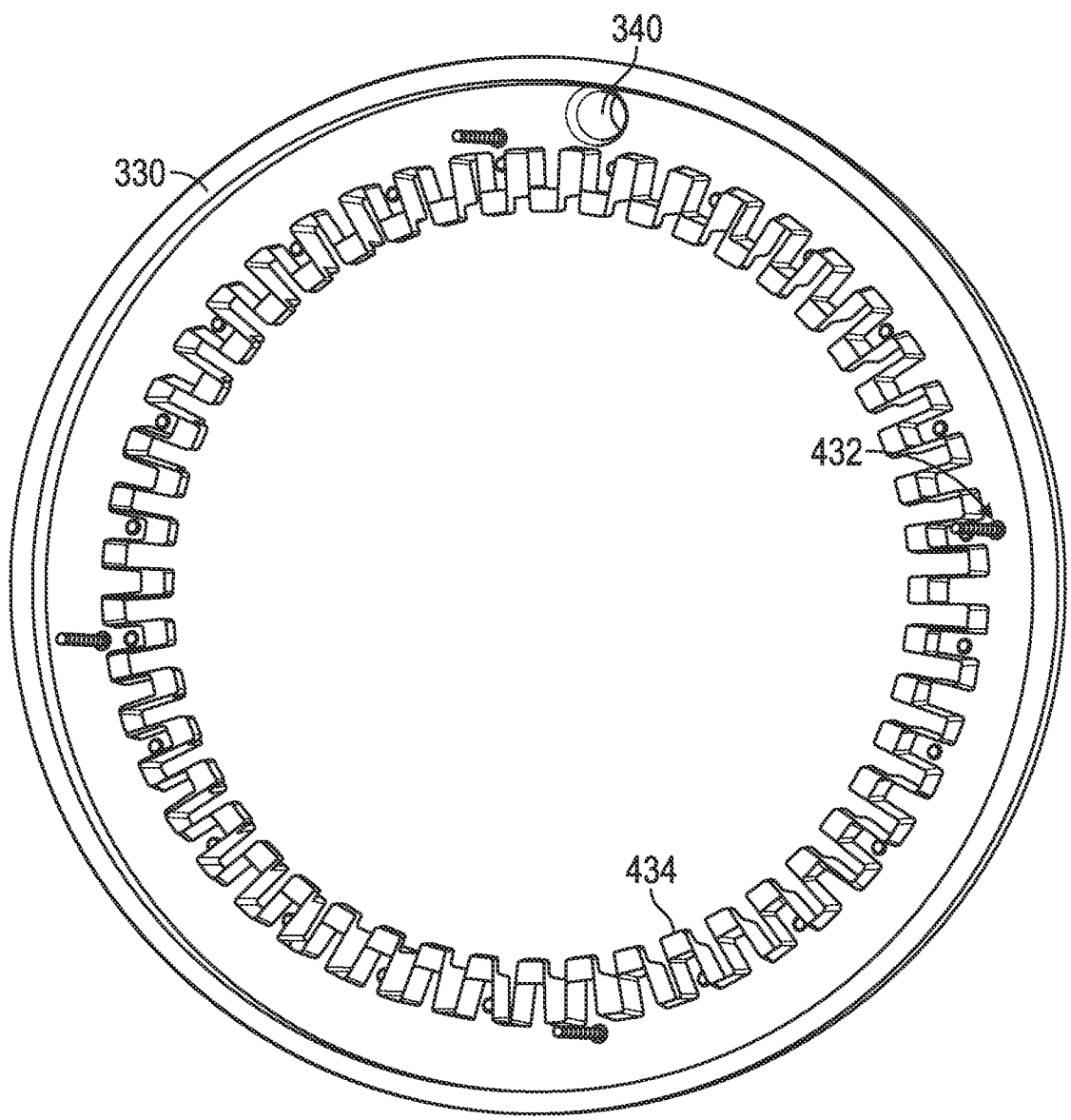
FIG. 4 illustrates a perspective back-facing view of an example stator substrate panel in accordance with one or more implementations of the subject technology.

FIG. 4 illustrates a perspective back-facing view of an example stator substrate panel in accordance with one or more implementations of the subject technology. In FIG. 4, the substrate 330 can form openings 434 at a radially inner side of the substrate 330 facing a rotor (e.g., the rotor 150 of FIG. 2) that align with a slot opening (e.g., the stator coil slot 126 of FIG. 2) of a stator core (e.g., the stator body 112 of FIG. 3) when the substrate 330 is coupled onto the stator body 112. As illustrated in FIG. 4, the substrate 330 includes alignment pins 432 that protrude outward from the back surface of the substrate 330 and are arranged at designated locations on the back surface of the substrate 330. The alignment pins 432 may be molded features that can be created through injection molding using similar materials as the substrate 330. The alignment pins 432 can be used to locate the substrate 330 on the outer side surface of the stator body 112 as illustrated in FIG. 3 and ensure retention of the substrate 330.

The substrate 330 includes an input port of the manifold 340 on the front surface of the substrate 330 for ingress of a cooling fluid and an output port of the manifold 340 on the back surface of the substrate 330 for egress of the cooling fluid (as depicted in FIG. 4) to distribute the cooling fluid through the axial channels of the stator body 112. The substrate 330 includes a deformed section on the back surface of the substrate 330 such that the substrate 330 can form the cavity 350 between the back surface of the substrate 330 and the outer side surface of the stator body 112 when the substrate 330 is fastened to the stator body 112. In this regard, the substrate 330 facilitates the controlled extraction and transfer of the cooling fluid from metal to predetermined locations. This capability facilitates the directed routing of the cooling fluid through designated channels, subsequently guiding its passage through the axial channels of the stator body 112. For example, the axial channel is located where it is to allow cooling fluid to remove heat from both the conductors as well as the tooth/core/steel of the stator body 112 via direct contact with those components.

Figure 5:
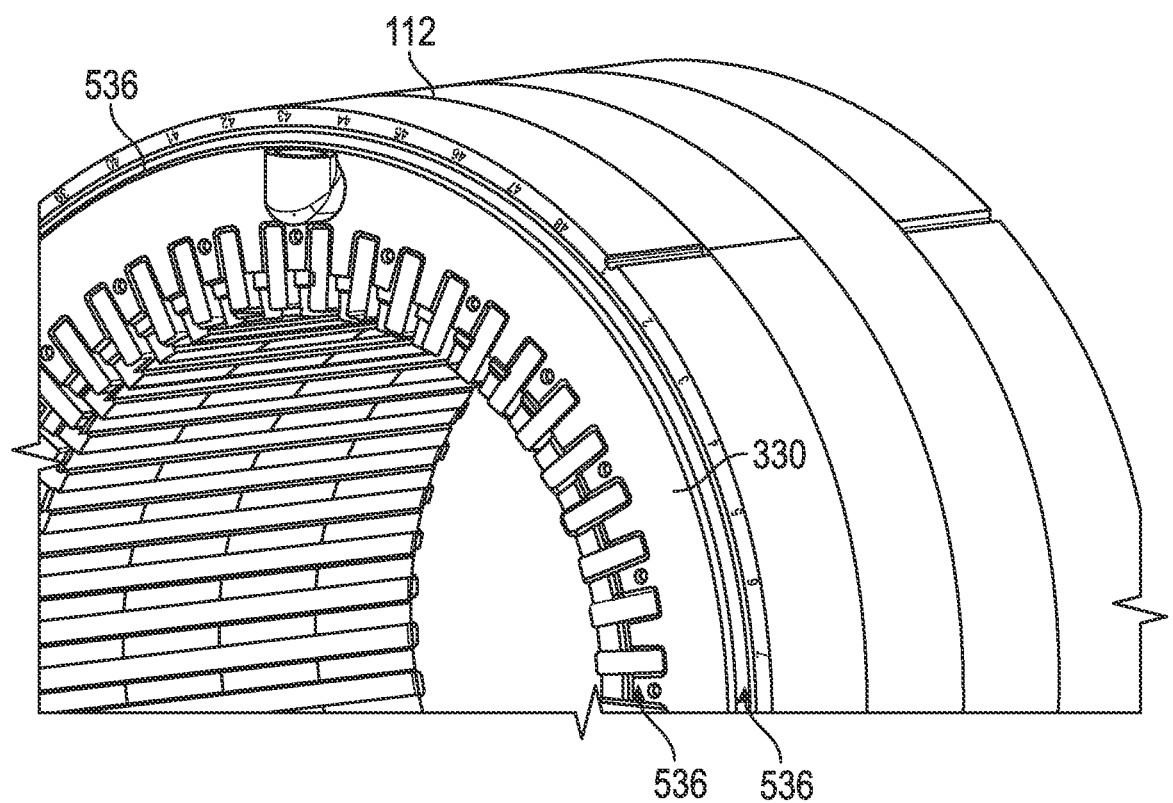
FIG. 5 illustrates a perspective sectional view of a portion of the stator of FIG. 3 in accordance with one or more implementations of the subject technology.

FIG. 5 illustrates a perspective sectional view of a portion of the stator of FIG. 3 in accordance with one or more implementations of the subject technology. The stator body 112 can include fastening locations 536 for fastening, clamping and/or bonding the substrate 330 to the stator body 112. For example, the substrate 330 may be epoxy bonded to the stator body 112 at the fastening locations 536. In other examples, the substrate 330 may be coupled in place to the stator body 112 at the fastening locations 536 by way of a clamping method (e.g., using a fastener, pinching the substrate 330 between wires and the stator body 112, pinching the substrate 330 between the stator body 112 and motor housing, etc.). The fastening locations 536 may be disposed circumferentially around the outer radial diameter of the substrate 330 and between the openings 434 around the inner radial diameter of the substrate 330. In one or more implementations, the fastening locations 536 may be disposed at a radially inner side of the substrate 330 and at a radially outer side of the substrate 330.

Figure 6:
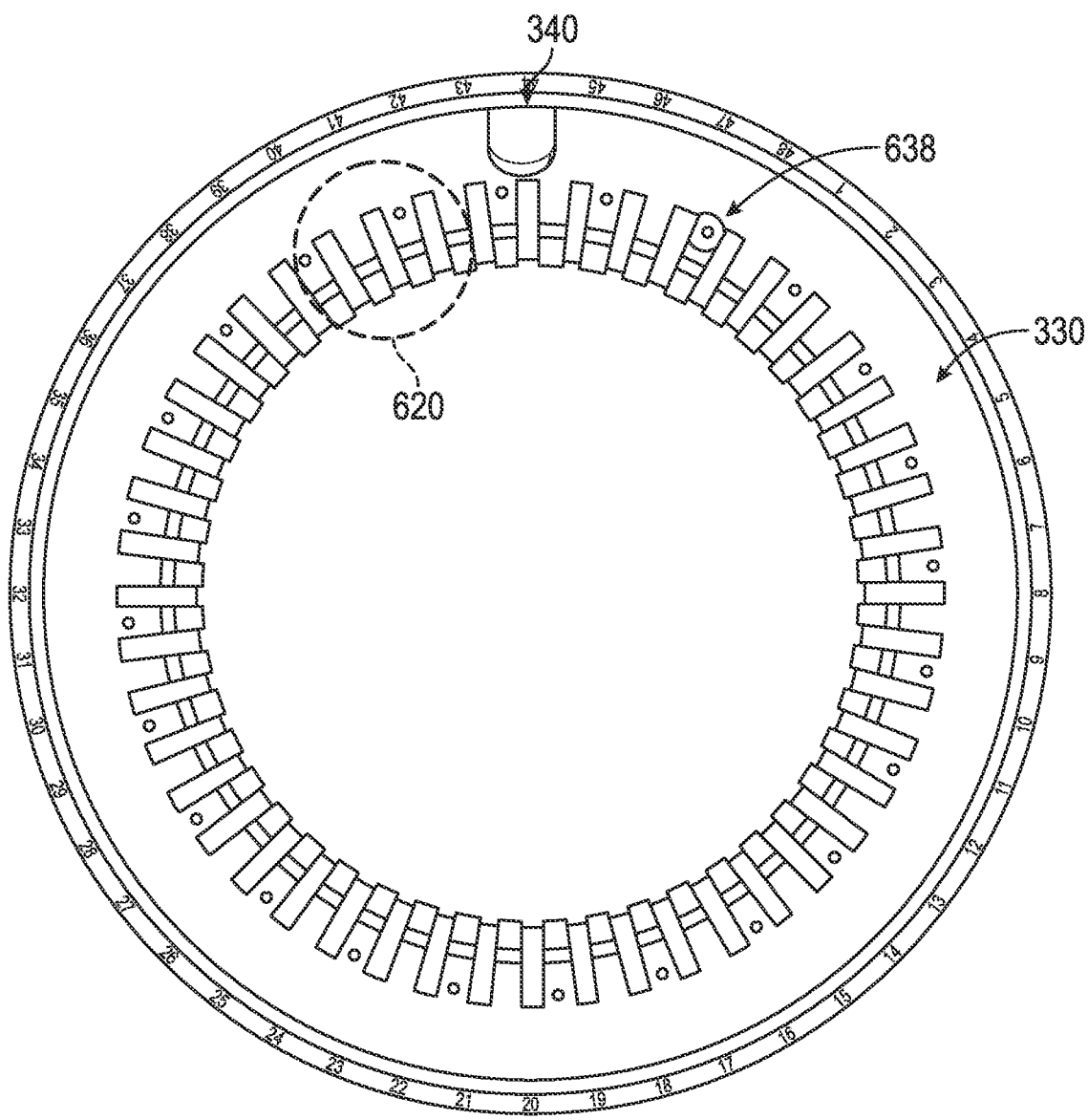
FIG. 6 illustrates a front-facing view of the stator of FIG. 3 in accordance with one or more implementations of the subject technology.

FIG. 6 illustrates a front-facing view of the stator of FIG. 3 in accordance with one or more implementations of the subject technology. To introduce a cooling fluid or oil into the axial channels formed along the longitudinal axis of the stator coil slot 126, the substrate 330 includes a sealed manifold (e.g., the manifold 340), directing fluid from a source and feeding it into the axial channels adjacent the stator coil slot 126 for temperature regulation of the stator body 112 and the motor 100. Furthermore, the manifold 340 can be equipped with strategically located and sized orifices 638 to enable the spraying of the cooling fluid onto the end turns in the opposite direction, creating a holistic cooling solution that encompasses the stator coil slots 126, the stator body 112, and end turns at both ends of the motor 100.

In one or more implementations, the stator 110 includes the stator coil slots 126 (e.g., a subset of stator coil slots 620) arranged at a radially inner side of the stator body 112 facing a rotor (e.g., the rotor 150 of FIG. 2). Each of these stator coil slots 126 may include a channel geometry as extensions of the stator coil slots 126 themselves. This structural configuration permits the distribution (e.g., pumping) of cooling fluid or oil through the stator body 112, providing a direct cooling mechanism that effectively addresses major heat sources, including the copper conductors and the core material itself.

In one or more implementations, the substrate 330 includes orifices 638 through which cooling fluid emerges and contacts the exterior surfaces of the stator coils 120. The orifice 638 may serve as output holes such that fluid may egress through the orifice 638 by a process primarily driven by pressure. The cooling fluid may be directed to spray onto the windings of the stator coils 120, facilitating the cooling process at one end, and then it proceeds to cool the windings on the other end. In one or more implementations, the channel positioning also serves to direct the pressurized cooling fluid to spray on the other end turn at the opposite end from the orifice 638, further removing heat from that part of the motor 100 as well.

The orifice 638 may include a specific geometry that allows them to protrude slightly from the front surface of the substrate 330. The orifices 638 can be sized according to desired parameters, including frequency and flow rate. To control the rate of cooling, adjustments can be made using a pump. Increasing the pump's RPM augments the flow rate, consequently elevating the pressure, which allows for varying cooling rates. However, cooling may be limited to a specific temperature range.

In one or more implementations, the orifices 638 may be arranged radially around the inner side of the substrate 330 and may be located in between the openings 434. The substrate 330 may include an arbitrary number of orifices 638 and the number of orifices 638 may vary depending on implementation that suit specific cooling requirements without departing from the scope of the present disclosure. In one or more implementations, the substrate 330 includes the orifices 638 between consecutive openings 434. In one or more other implementations, the substrate 330 includes the orifices 638 between non-consecutive openings 434.

In one or more other implementations, the stator body 112 includes a transition in orientation between the stator coil slots 126. For example, the stator body 112 may include an arrangement of the stator coil slots 126 in an alternating pattern, with even-odd slot arrangements on one end and a different configuration on the opposite end. In this regard, the stator body 112 may include a mechanism at the center of the stator body 112 to facilitate this transition. This mechanism may direct the movement from one stator coil slot 126 to another, ensuring a symmetric distribution of heat generation. Consequently, each stator coil slot 126 is considered for the integration of these transitions, with the option to adjust the size of the transitional elements as needed.

Figure 7:
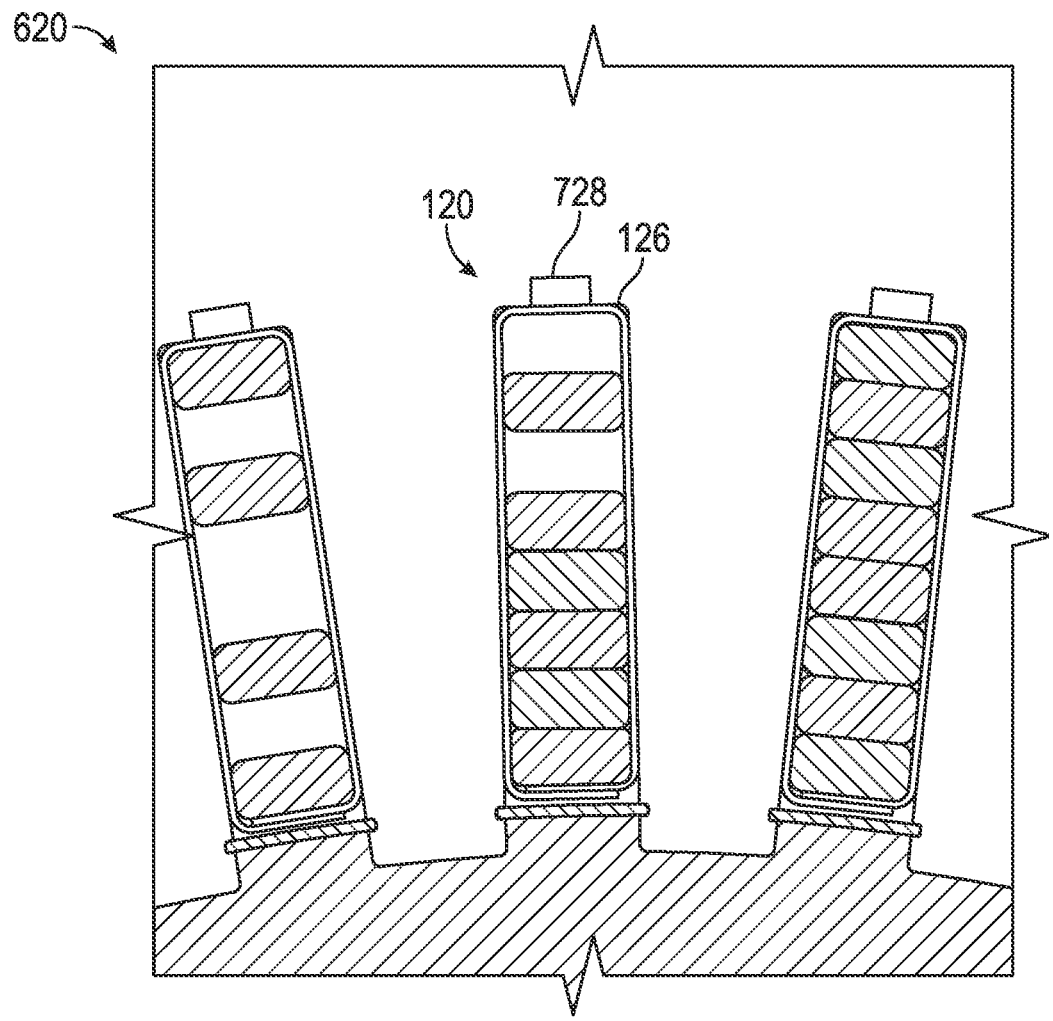
FIG. 7 illustrates a sectional view of a portion of a stator coil slot with a notched channel in accordance with one or more implementations of the subject technology.

FIG. 7 illustrates a sectional view of a portion of a stator coil slot with a notched channel in accordance with one or more implementations of the subject technology. The subset of stator coil slots 620 includes a stator coil 120 with a stator coil slot 126. In one or more implementations, the stator coil slot 126 includes notch 728 that establishes an alternative pathway for the fluid. This pathway traverses the internal channel, egressing to facilitate cooling on both the outer and inner surfaces of the stator body 112.

The stator coil slot 126 can include a number of openings formed around its periphery. The notch 728 can include multiple placements relative to the stator coil slot 126 that serve as axial channels, whether on the top edge of the stator coil slot 126 (see FIG. 7) or on the sides of the stator coil slot 126 (see FIG. 9). As illustrated in FIG. 7, the notch 728 is formed on the top edge of the stator coil slot 126.

The notch 728 formed on the top edge of the stator coil slot 126 can include a channel geometry that facilitates the provision of adequate cooling fluid flow to remove more heat than is generated without causing adverse effects on the radial and tangential flux paths within the stator body 112. The notch 728 can employ various shapes, such as triangular or circular, among others. As illustrated in FIG. 7, the notch 728 has a rectangular shape.

The adjustment of channel size, location, and frequency can be achieved through the modification of lamination geometry, thereby allowing for flexibility in the cooling strategy. This adaptation enables the selection of different cooling channel configurations based on specific cooling requirements and the electromagnetic (EM) design of the motor 100.

Figure 8:
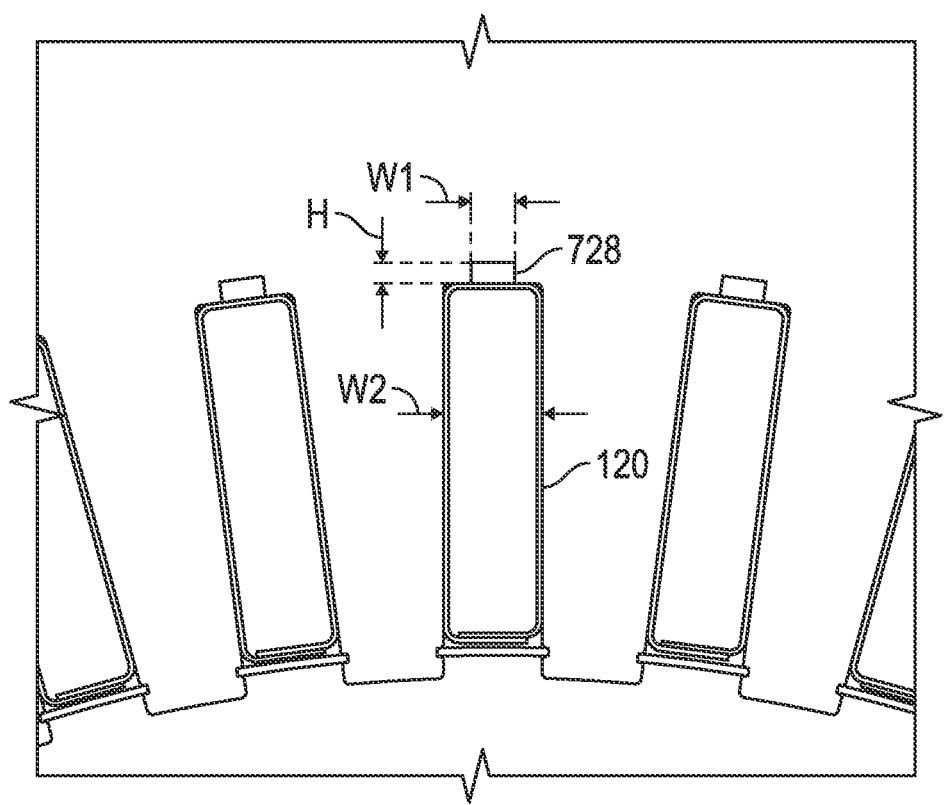
FIG. 8 illustrates another view of the portion of the stator coil slot with the notched channel of FIG. 7 in accordance with one or more implementations of the subject technology.

FIG. 8 illustrates another view of the portion of the stator coil slot with the notched channel of FIG. 7 in accordance with one or more implementations of the subject technology. The notch 728 formed on the top edge of the stator coil slot 126 can be defined by dimensions, width (W1) and height (H). In one or more implementations, the height of the notch

728, H, is minimized while the width of the notch 728, W1, is increased, facilitating optimal design considerations. In one or more implementations, the width of the notch 728, W1, is smaller than a width of the stator coil slot 126 containing the stator coil 120, W2.

Figure 9:
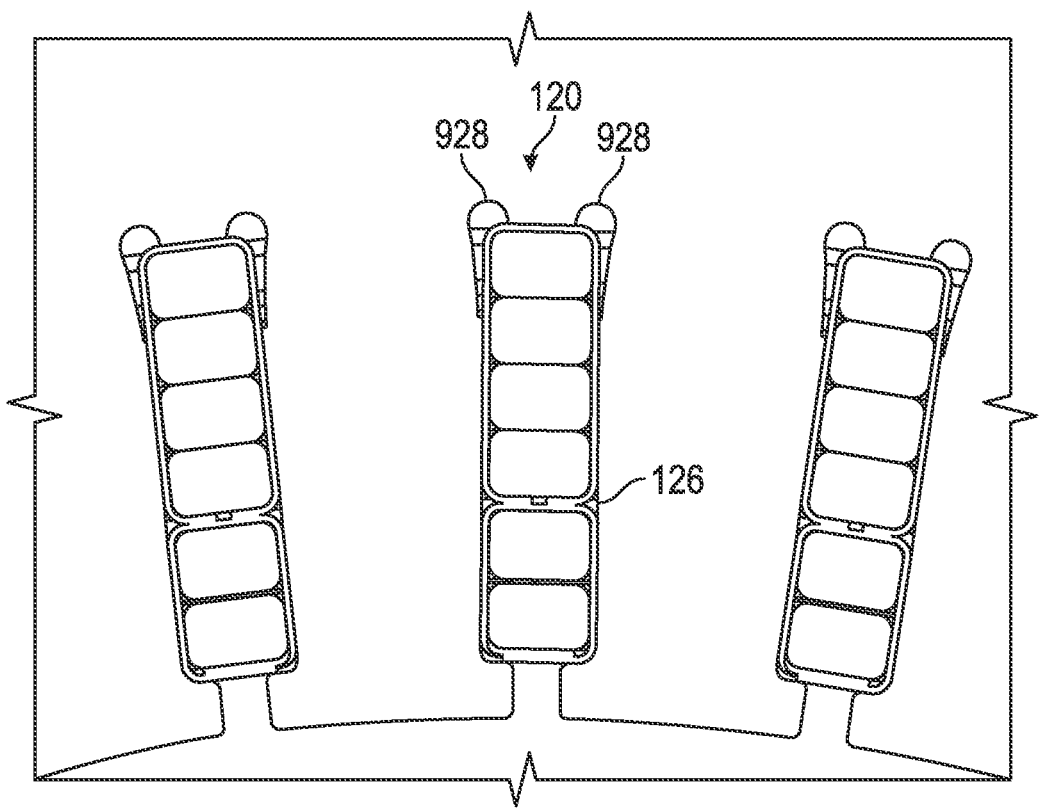
FIG. 9 illustrates a sectional view of a portion of a stator coil slot with a rounded-shaped corner channel in accordance with one or more implementations of the subject technology.

FIG. 9 illustrates a sectional view of a portion of the stator coil slot 126 with a rounded-shaped corner channel in accordance with one or more implementations of the subject technology. In one or more implementations, the stator coil slot 126 includes notch 928. In one or more implementations, the stator coil slot 126 includes a single notch 928. In one or more other implementations, the stator coil slot 126 includes a pair of notches 928. As illustrated in FIG. 9, the stator coil slot 126 includes a pair of notches 928 that are formed on the corner top edges of the stator coil slot 126. As illustrated in FIG. 9, each of the pair of notches 928 has a circular shape.

Figure 10:
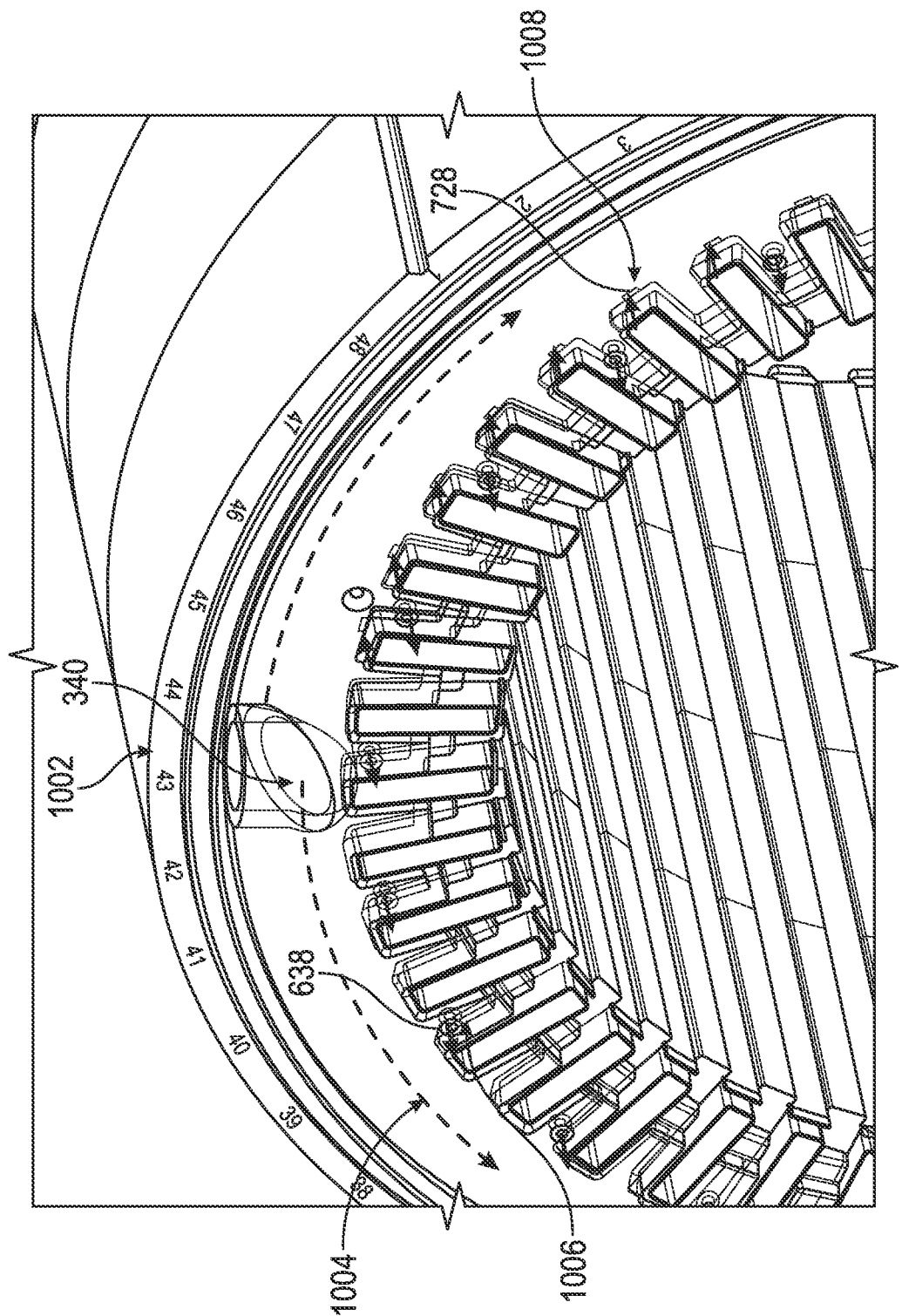
FIG. 10 illustrates a perspective sectional view of a portion of the stator of FIG. 3 in accordance with one or more implementations of the subject technology.

FIG. 10 illustrates a perspective sectional view of a portion of the stator of FIG. 3 in accordance with one or more implementations of the subject technology. As conceptually illustrated in FIG. 3, at 1002, a fluid (e.g., a cooling fluid or an oil) enters the manifold 340 from a source. The substrate 330 and at least a portion of the outer surface steel plate of the stator body 112 are separated, creating a cavity (e.g., cavity 350 of FIG. 3) inside where the fluid is internally distributed around an annulus formed by the cavity 350. At 1004, the flow of the fluid occurs within this annulus, which is effectively sealed around the radial edges of the substrate 330, thus directing the fluid downward and routed around the annulus, as illustrated by the dashed arrowed lines. The size of the annulus can be adjusted to accommodate specific flow rates and pressure requirements.

At 1006, the fluid distributed around the annulus can exit the substrate 330 through the orifices 638 to cool the end turns of the stator coils 120. At 1008, the fluid can enter the axial channels (represented as the notches 728 formed around the stator coil slots 126) to directly cool the stacked steel sheets of the stator body 112 and windings of the stator coils 120. For example, the axial channel is located where it is to allow cooling fluid to remove heat from both the conductors as well as the tooth/core/steel of the stator body 112 via direct contact with those components. To provide a comprehensive understanding of the configuration, the windings of the stator coils 120 are present within this context. These windings are separated by a barrier from the cooling fluid and the stator coils 120. This barrier can be positioned as closely as possible to facilitate the cooling of the windings.

The substrate 330 includes a continuous pathway within the cavity 350 of the substrate 330. In this regard, the fluid enters at one end of the substrate 330 via the manifold 340, traverses a pathway (e.g., labyrinthine pathway) within the cavity 350 of the substrate 330, and exits the substrate 330 at the other end of the stator body 112 via the axial channels and/or via the orifices 638. The fluid is likely to be warmer upon egress, resulting in reduced cooling efficiency. However, the subject technology directs the fluid outward, effectively utilizing any remaining heat capacity to absorb heat from the heat sources located within the stator body 112.

FIG. 11 illustrates a sectional view of a portion of a stator in accordance with one or more implementations of the subject technology. At 1110, the fluid enters an axial channel 1130 via the manifold 340 and entering a region with a liner defining the fluid's pathway in relation to the stator coils 120. In one or more implementations, the thickness of the liner is substantially small, falling within the range of hundreds of microns. For example, the liner may measure approximately 0.2 millimeters or 200 microns. Notably, the liner can exhibit efficient heat conduction properties, enabling direct cooling through it.

At 1120, the fluid exits the axial channel 1130 at the opposite end of the stator body 112 for additional cooling of the end turns of the stator coils 120. This process involves the fluid gathering heat from the heat sources and returning to the system via a sump and heat exchanger. As such, it minimizes the need for extensive looping of the fluid, as the objective is to significantly heat the fluid due to the direct approach to managing heat sources.

Figure 12:
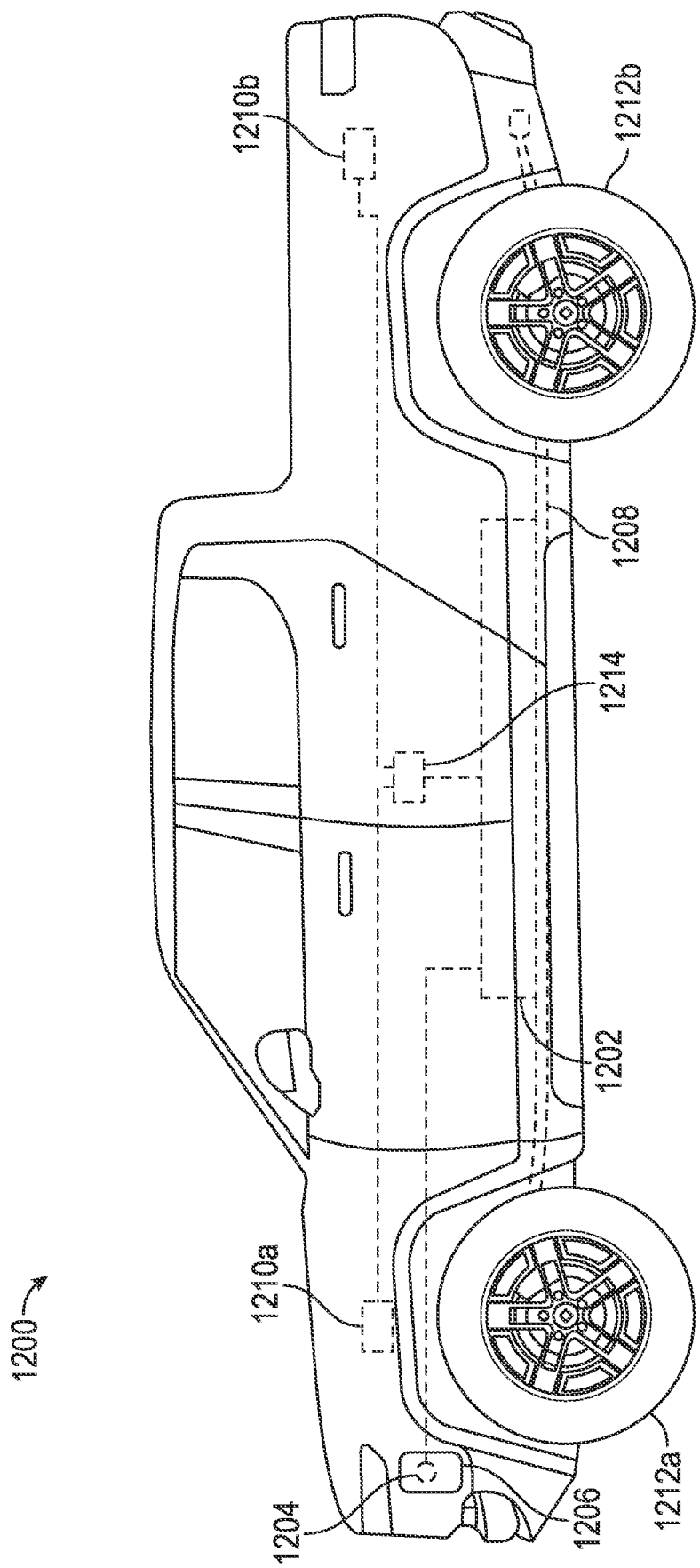
FIG. 12 illustrates an exemplary embodiment of a vehicle, in accordance with aspects of the present disclosure.

According to some embodiments, for example as shown in FIG. 12, an example implementation of a movable apparatus takes the form of a vehicle 1200. In some embodiments, the vehicle 1200 is a sport utility vehicle. In the embodiment shown in FIG. 12, the vehicle 1200 is a truck. Generally, the vehicle 1200 may take the form of any motorized vehicle, including motorized vehicles with an internal combustion engine and/or one or more electric motors. In this regard, other implementations of the vehicle 1200 may include land-based vehicles, such as a car (e.g., sedan, hatchback), a van, a motorcycle, a motorized scooter, or a commercial truck, as non-limiting examples. Still further, other implementations of the vehicle 1200 may include sea or air transport vehicles, planes, helicopters, submarines, boats, or drones, as non-limiting examples.

As shown, the vehicle 1200 includes a battery pack 1202. The battery pack 1202 may be coupled (e.g., electrically coupled) to one or more electrical systems of the vehicle 1200 to provide power to the one or more electrical systems. The battery pack 1202 may include one or more battery modules (not shown in FIG. 12), with each of the one or more battery modules carrying several battery cells. In some embodiments, the battery pack 1202 does not include any battery modules and takes the form of a cell-to-pack configuration. Also, the battery cells of the battery pack 1202 may include rechargeable battery cells, and accordingly, the battery pack 1202 may be referred to as a rechargeable battery pack. In this regard, the vehicle 1200 includes a port 1204 (e.g., charge port) designed to receive a cable connector (not shown in FIG. 12) that provides power (e.g., AC power) that is converted to DC power to charge the battery pack 1202. The port 1204 can be accessed by moving a cover 1206. The vehicle 1200 may include a chassis 1208 used to support the battery pack 1202 and various other components (not shown in FIG. 12) of the vehicle 1200, such as the suspension and differential, as non-limiting examples.

The battery pack 1202 may couple to a drive unit 1210*a* and a drive unit 1210*b*. The drive units 1210*a* and 1210*b* may include, for example, a motor, an inverter, a gear box, and a differential. The drive unit 1210*a* is generally located at the front of the vehicle 1200, while the drive unit 1210*b* is generally located at the back of the vehicle 1200. Accordingly, the drive unit 1210*a* and the drive unit 1210*b* may be referred to as a front drive unit and a rear drive unit, respectively. While two drive units (e.g., drive units 1210*a* and 1210*b*) are shown, the vehicle 1200 may include additional drive units. In some embodiments, each of the drive units 1210*a* and 1210*b* is an internal combustion engine. In the embodiment shown in FIG. 12, each of the drive units 1210*a* and 1210*b* is an electric motor (e.g., the motor 100 of FIG. 1). In this regard, the drive unit 1210*a* and the drive unit 1210*b* can use energy (e.g., electrical energy) stored in the battery pack 1202 for propulsion in order to drive (e.g., rotationally drive) a wheel 1212*a* and a wheel 1212*b*, respectively. The wheels 1212*a* and 1212*b* each represent an additional front wheel and rear wheel, respectively, of the vehicle 1200. By driving the wheels 1212*a* and 1212*b*, the vehicle 1200 can move in various directions. In one or more implementations, each of the drive units 1210*a* and 1210*b* include the motor 100 having the stator 110, including the axial channels formed within the stator coil slots and substrate for distributing the cooling fluid in and around the stator body 112 and stator coil slots 126 for temperature regulation of the motor 100.

Also, the vehicle 1200 may further include a vehicle management system 1214 designed to provide torque commands to the drive units 1210*a* and 1210*b*. The drive units 1210*a* and 1210*b* may operate in accordance with torque shaping logic provided by the vehicle management system 1214. In this regard, the drive units 1210*a* and 1210*b* can generate, based on the torque shaping logic, a torque output provided to the wheels 1212*a* and 1212*b*, respectively, that dictate the speed at which the vehicle 1200 is traveling.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the present disclosure. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different orders. Some of the steps, operations, or processes may be performed simultaneously. The accompanying method claims, if any, present elements of the various steps, operations, or processes in a sample order, and are not meant to be limited to the specific order or hierarchy presented. These may be performed in serial, linearly, in parallel, or in different order. It should be understood that the described instructions, operations, and systems can generally be integrated together in a single software/hardware product or packaged into multiple software/hardware products.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A stator for an electric motor, the stator comprising:
a stator body comprising a plurality of stator coil slots and a plurality of stator coils disposed respectively within the plurality of stator coil slots, each of the plurality of stator coil slots has a periphery defined by a first edge arranged at a radially inner side of the stator body facing a rotor, a second edge opposite of the first edge, and a sidewall between the second edge and the first edge; and
a substrate mechanically coupled to the stator body and configured to receive a fluid via a manifold and distribute the fluid through a cavity formed between the substrate and the stator body,
wherein each of the plurality of stator coil slots is formed adjacent to an opening, the opening formed outside of the periphery of a corresponding stator coil slot and extending from at least a portion of the second edge to at least a portion of the sidewall, wherein the opening forms a channel that extends longitudinally across the stator body for distributing the fluid through the channel.

2. The stator of claim 1, wherein the substrate comprises an orifice configured to output the fluid from the cavity based on a pressure within the cavity.

3. The stator of claim 1, wherein the substrate is coupled to the stator body at one or more locations at a radially inner side of the substrate and at a radially outer side of the substrate.

4. The stator of claim 1, wherein the substrate includes a plurality of openings at a radially inner side of the substrate facing the rotor that align with the plurality of stator coil slots of the stator body based at least in part on the substrate being mechanically coupled onto the stator body.

5. The stator of claim 1, wherein the opening includes a channel geometry having a first width that is smaller than a second width of the corresponding stator coil slot and a height extending from the second edge of the corresponding stator coil slot.

6. The stator of claim 5, wherein the channel geometry of the opening includes a rectangular shape, and wherein the opening is centered at the second edge.

7. The stator of claim 5, wherein the channel geometry of the opening includes a circular shape.

8. A motor comprising:
a rotor; and
a stator comprising:
a stator body comprising a plurality of stator coil slots and a plurality of stator coils disposed respectively within the plurality of stator coil slots, each of the plurality of stator coil slots has a periphery defined by a first edge arranged at a radially inner side of the stator body facing the rotor, a second edge opposite of the first edge, and a sidewall between the second edge and the first edge; and
a substrate mechanically coupled to the stator body and configured to receive a fluid via a manifold and distribute the fluid through a cavity formed between the substrate and the stator body,
wherein each of the plurality of stator coil slots is formed adjacent to an opening, the opening formed outside of the periphery of a corresponding stator coil slot and extending from at least a portion of the second edge to at least a portion of the sidewall, wherein the opening forms a channel that extends longitudinally across the stator body for distributing the fluid through the channel.

9. The motor of claim 8, wherein the substrate comprises an orifice configured to output the fluid from the cavity based on a pressure within the cavity.

10. The motor of claim 8, wherein the substrate is coupled to the stator body at one or more locations at a radially inner side of the substrate and at a radially outer side of the substrate.

11. The motor of claim 8, wherein the substrate includes a plurality of openings at a radially inner side of the substrate facing the rotor that align with the plurality of stator coil slots of the stator body based at least in part on the substrate being mechanically coupled onto the stator body.

12. The motor of claim 8, wherein the opening includes a channel geometry having a first width that is smaller than a second width of a corresponding stator coil slot.

13. The motor of claim 12, wherein the channel geometry of the opening includes a rectangular shape.

14. The motor of claim 12, wherein the channel geometry of the opening includes a circular shape.

15. A vehicle, comprising:
a drive unit comprising a stator and a rotor,
the stator comprising:
a stator body comprising a plurality of stator coil slots and a plurality of stator coils disposed respectively within the plurality of stator coil slots, each of the plurality of stator coil slots has a periphery defined by a first edge arranged at a radially inner side of the stator body facing the rotor, a second edge opposite of the first edge, and a sidewall between the second edge and the first edge; and
a substrate mechanically coupled to the stator body and configured to receive a fluid via a manifold and distribute the fluid through a cavity formed between the substrate and the stator body,
wherein each of the plurality of stator coil slots is formed adjacent to an opening, the opening formed outside of the periphery of a corresponding stator coil slot and extending from at least a portion of the second edge to at least a portion of the sidewall, wherein the opening forms a channel that extends longitudinally across the stator body for distributing the fluid through the channel.

16. The vehicle of claim 15, wherein the substrate comprises an orifice configured to output the fluid from the cavity based on a pressure within the cavity.

17. The vehicle of claim 15, wherein the substrate is coupled to the stator body at one or more locations at a radially inner side of the substrate and at a radially outer side of the substrate.

18. The vehicle of claim 15, wherein the substrate includes a plurality of openings at a radially inner side of the substrate facing the rotor that align with the plurality of stator coil slots of the stator body based at least in part on the substrate being mechanically coupled onto the stator body.

19. The vehicle of claim 15, wherein the opening includes a channel geometry having a first width that is smaller than a second width of a corresponding stator coil slot.

20. The vehicle of claim 19, wherein the channel geometry of the opening includes a rectangular shape or a circular shape.

\* \* \* \* \*